(12) United States Patent
Todd et al.

(10) Patent No.: US 10,587,413 B1
(45) Date of Patent: Mar. 10, 2020

(54) DECENTRALIZED IDENTITIES FOR CROSS-ENTERPRISE AUTHENTICATION AND/OR AUTHORIZATION

(71) Applicant: EMC IP Holding Company LLC, Hopkinton, MA (US)

(72) Inventors: Stephen Todd, Shrewsbury, MA (US); Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 15/660,335

(22) Filed: Jul. 26, 2017

(51) Int. Cl.
| | | |
|---|---|---|
| *G06F 21/00* | (2013.01) | |
| *H04L 9/32* | (2006.01) | |
| *H04L 29/06* | (2006.01) | |
| *G06Q 10/10* | (2012.01) | |

(52) U.S. Cl.
CPC .......... *H04L 9/3234* (2013.01); *G06Q 10/10* (2013.01); *H04L 9/3247* (2013.01); *H04L 63/102* (2013.01)

(58) Field of Classification Search
CPC ... H04L 9/3234; H04L 9/3247; H04L 63/102; G06Q 10/10
USPC ........................................................ 713/185
See application file for complete search history.

(56) References Cited

U.S. PATENT DOCUMENTS

| | | | | |
|---|---|---|---|---|
| 7,555,460 B1* | 6/2009 | Barkan | .................. | G06Q 20/06 235/492 |
| 9,635,000 B1* | 4/2017 | Muftic | ................ | H04L 63/0435 |
| 2013/0139271 A1* | 5/2013 | Arrelid | .................. | G06F 21/10 726/27 |
| 2013/0145419 A1* | 6/2013 | Hu | ......................... | G06F 21/604 726/1 |
| 2018/0115426 A1* | 4/2018 | Andrade | ............... | H04L 9/0637 |

OTHER PUBLICATIONS

David Mills, Distributed ledger technology in payments, clearing, and settlement; www.papers.ssrn.com; p. 1-36, (Year: 2016).*
M. Ali et al., "Blockstack: A Global Naming and Storage System Secured by Blockchains," Proceedings of the USENIX Annual Technical Conference (USENIX ATC), Jun. 22-24, 2016, pp. 181-194.
M. Ali et al., "Blockstack: A New Decentralized Internet," https://blockstack.org, Whitepaper Version 1.0.1, May 16, 2017, 22 pages.
Wikipedia, "Blockstack," https://en.wikipedia.org/wiki/Blockstack, May 28, 2017, 2 pages.
Satoshi Nakamoto, "Bitcoin: A Peer-to-Peer Electronic Cash System," Whitpaper, https://bitcoin.org/bitcoin.pdf, Nov. 2008, 9 pages.

* cited by examiner

*Primary Examiner* — Monjur Rahim
(74) *Attorney, Agent, or Firm* — Ryan, Mason & Lewis, LLP (57) ABSTRACT

At least one identity for a given entity of a first enterprise is established in accordance with a decentralized identity management system maintained in accordance with a distributed ledger. The identity of the given entity of the first enterprise and a set of attributes relating to the identity are defined by at least one cryptographically signed token file. The cryptographically signed token file is referenced in the distributed ledger enabling a second enterprise to authenticate and/or authorize the given entity in accordance with at least one of the set of attributes.

20 Claims, 5 Drawing Sheets

FIG. 2
200

| JSON Web Token 1 |
| JWT 2 |
| JWT3 |

202 — [{
204 — "encrypted": false,
"parentPublicKey":
"04cabba0b5b9a871dbaa11c044066e281c5feb57243c7d2a452f06a0d70
8613a46ced59f9f806e601b3353931d1e4a98d7040127f31016311050bed
c0d4f1f62ff", "
206 — "token": "
- eyJhbGciOiJFUzI1NksiLCJ0eXAiOiJKV1QifQ
- eyJpc1L35qYXR0ZXIi−VkYzBkNGYxZjYyZmYifX0.
- 9ifNYJxWmekoBCzyFpmv9ZNbJaECYKnRBpZnSPSvtKE5NGLbZkb
3nF6yG−FcihMivDc4XLhouEC1Hl3ZOwoUA"
- }]

302 — ESTABLISH AT LEAST ONE IDENTITY FOR A GIVEN ENTITY OF A FIRST ENTERPRISE IN ACCORDANCE WITH A DECENTRALIZED IDENTITY MANAGEMENT SYSTEM MAINTAINED IN ACCORDANCE WITH A DISTRIBUTED LEDGER, WHEREIN THE IDENTITY OF THE GIVEN ENTITY OF THE FIRST ENTERPRISE AND A SET OF ATTRIBUTES RELATING TO THE IDENTITY ARE DEFINED BY AT LEAST ONE CRYPTOGRAPHICALLY SIGNED TOKEN FILE

304 — REFERENCE THE CRYPTOGRAPHICALLY SIGNED TOKEN FILE IN THE DISTRIBUTED LEDGER ENABLING A SECOND ENTERPRISE TO AT LEAST ONE OF AUTHENTICATE AND AUTHORIZE THE GIVEN ENTITY IN ACCORDANCE WITH AT LEAST ONE OF THE SET OF ATTRIBUTES

TOKEN FILE ATTRIBUTE SET:

- 402 — IDENTITY AUTHORIZED BY VENDOR (LOW)
- 404 — IDENTITY AUTHORIZED BY VENDOR AND VALID SERVICE REQUEST FROM CUSTOMER FOR SPECIFIC PRODUCT (MEDIUM)
- 406 — VENDOR IDENTITY AND VALID SERVICE REQUEST FROM CUSTOMER CONTAINING NAME OF VENDOR IDENTITY FOR SPECIFIC PRODUCT (HIGH)
- 408 — VENDOR IDENTITY AND VALID SERVICE REQUEST FOR SPECIFIC PRODUCT AUTHORIZED BY ONE OR MORE DEPARTMENTS OF CUSTOMER (VERY HIGH)
- 410 — ONE OR MORE ADDITIONAL CONDITIONS

DECENTRALIZED IDENTITIES FOR CROSS-ENTERPRISE AUTHENTICATION AND/OR AUTHORIZATION

FIELD

The field relates generally to authentication and authorization, and more particularly to the use of decentralized identity management to provide such authentication and/or authorization.

BACKGROUND

There are multiple situations where an employee of a first company needs access to sites or systems belonging to a second company. For example, the first company may be a vendor that sells and/or services a product (e.g., a data storage device or other storage resource), and the second company may be a customer of the first company that purchases and uses that product at one of its facilities (e.g., a data center). While a vendor servicing a product owned by a customer is one common such example, other situations may include attending meetings at a secure customer facility, attending a conference call where only certified participants should attend, and the like. In each case, it is typically necessary or desired for the individual from the first company to be authenticated or authorized by the second company.

Today such situations are often resolved in a manner that either relies on physical security tokens carried by the individual which can be faked, stolen, or forged, or relies on a trusted, personal relationship between parties such that the parties recognize each other or each other's voices.

For service situations especially, these issues are further compounded as service access typically requires an elevated/privileged level of access to assets in the customer's environment (e.g., data center). This access to machines (e.g., computing and/or storage devices) is dependent on knowing a set of credentials, often set by the company creating the product (e.g., where the product is the machine or the product runs on the machine), and are typically uniform across all instances of the product at a certain revision. Using these well-known credentials and a stale or faked physical access mechanism, a service engineer can compromise multiple product instances.

SUMMARY

Embodiments of the invention provide systems and methods for decentralized identity management for cross-enterprise authentication and/or authorization.

For example, in one embodiment, a method comprises the following steps. At least one identity for a given entity of a first enterprise is established in accordance with a decentralized identity management system maintained in accordance with a distributed ledger. The identity of the given entity of the first enterprise and a set of attributes relating to the identity are defined by at least one cryptographically signed token file. The cryptographically signed token file is referenced in the distributed ledger enabling a second enterprise to at least one of authenticate and authorize the given entity in accordance with at least one of the set of attributes.

Advantageously, illustrative embodiments utilize decentralized identity techniques with cryptographically signed token files to control authentication and/or authorization across a class of systems or situations, i.e., in a cross-enterprise environment.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a cloud infrastructure hosting multiple tenants that share cloud resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds).

More particularly, illustrative embodiments provide a decentralized identity management system for cross-enterprise authentication and/or authorization. In one or more illustrative embodiments, a decentralized identity management system known as "Blockstack" is adapted for cross-enterprise authentication and/or authorization. Blockstack is described in detail, for example, in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety. However, it is to be appreciated that embodiments are not limited to using Blockstack as a decentralized identity management system, and thus embodiments are more generally applicable to any other suitable, non-Blockstack based, decentralized identity management system.

In general, Blockstack uses a blockchain to bind a digital property, such as a name, to a given value. Immutability and therefore trust are provided in a decentralized manner by allowing for any new node in the system to independently verify data bindings through the blockchain. More particularly, a Blockstack architecture has four layers, two in the control plane and two in the data plane. The control plane includes a blockchain layer and a virtualchain layer. The data plane includes a routing layer and a data storage layer.

The blockchain layer is the bottommost functional layer, and serves to store the Blockstack operations (encoded in transactions on the blockchain distributed ledger) and to provide consensus on the order in which the Blockstack operations were written. Blockstack operations typically include name registrations, updates, and transfers.

The virtualchain layer is functionally implemented above the blockchain layer. The virtualchain layer is configured to define new Blockstack operations without changing any data on the blockchain layer. The logic for accepting or rejecting new Blockstack operations is contained in the virtualchain layer.

Above the control plane (blockchain layer and virtualchain layer), the data plane separates the function of routing requests (routing layer) from the function of storing data (data storage layer). More particularly, Blockstack uses zone files (having the same format as a zone file of a domain name service (DNS)) for routing information. The virtualchain layer binds names to respective hashes of the zone files and stores these bindings in the control plane. However, the zone files themselves are stored in the routing layer. The integrity of a given zone file is verified by verifying the hash of the given zone file in the control plane.

The data storage layer is the topmost functional layer in the Blockstack architecture. The actual data values of the name-value pairs are stored in the data storage layer, and are signed by the cryptographic key of the owner of the name. The integrity of a given data value can be verified in the control plane.

Accordingly, the Blockstack architecture uses these four functional layers to implement a naming system. Names are owned by cryptographic addresses of the underlying blockchain layer and their associated private keys. A user claims a name by being the first to perform a successful preorder and register operation for the name. Once a name is registered, a user can update the name-value pair. This is done by initiating an update operation and uploading the new value to the routing layer so as to change the name-value binding. The address that is allowed to sign subsequent transactions can be changed by a name transfer operation. Further details about the Blockstack architecture can be found, for example, in the above-referenced M. Ali et al. paper.

It is to be further understood that, in an illustrative Blockstack architecture, while the blockchain layer is maintained across a first set of distributed compute nodes, the other layers of the Blockstack architecture are maintained across a second set of distributed compute nodes which are in communication with one or more of the blockchain compute nodes.

As used herein, the terms "blockchain," "digital ledger" and "blockchain digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In the Blockstack context, examples of transactions can be operations of preordering a new name-value pair, registering a new name-value pair, and changing an existing name-value pair.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol in a Blockstack naming system and that embodiments of the invention are not limited to the above or any particular blockchain protocol or naming system implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Accordingly, in a Blockstack naming system, one or more compute nodes allow for identities to be created by registering a name and then associating identity information with that name (e.g., as described above, a reference pointer in the blockchain points to a given zone file, and the given zone file ultimately points to information about the user's identity). For example, assume that an identity for an employee of a company is created by the company using an identification badge number of the employee, e.g., emc-36173.id. The company keeps the private key for that identity and the Blockstack naming system accepts the identity in a two-phase commit ("preorder" command followed by "register" command) where the public key can verify the private key being used by the company. The identity is "remembered" across every node in the bitcoin ledger due to Blockstack's use of a private scratchpad location in a bitcoin transaction. The replication of each bitcoin transaction into a decentralized blockchain results in a public decentralized identity registry.

As mentioned above, there are many situations where an employee of one company (e.g., a product vendor) needs access to sites or systems belonging to another company (e.g., a product customer). For example, the employee of the vendor may need physical or remote computer access to the product installed at the customer site, the employee may be attending a meeting at a secure customer facility, and/or the employee may be attending a conference call for which only certified participants should attend. These are only a few examples of situations that require or would otherwise benefit from some form of cross-enterprise authentication and/or authorization. However, such situations today are resolved in a manner that either relies on a physical security token or on a trusted, personal relationship between parties. Such existing approaches have many drawbacks.

By way of example, an employee attending an initial customer meeting, especially one via a phone call, is typically identified only by name. There is no additional security or verification other than knowing the appropriate phone number of the conferencing service to use.

In another example, assume that an employee of a vendor was given access rights to sites at a customer location, via a badge or other physical token from the customer, but was subsequently terminated by the vendor. That terminated employee could maintain the badge from the customer and improperly gain access. There is no existing automated mechanism for the vendor to notify the customer to revoke such access.

Further, by way of example, once an employee knows the credentials to service a product, the employee may then service other instances of the product, either at the same customer or at different customers, even though he/she should not be authorized to do so. Even if this scenario is solved by the customer choosing the credentials for service access, someone (e.g., associated with the customer or otherwise) may impersonate the service personnel and perform any number of destructive or unsafe actions on the product.

Typically, the customer is not able to disable service personnel from accessing the product, except where specifically authorized. In situations where such actions are possible, existing approaches typically provide only a binary allow/disallow decision, rather than a more nuanced level of access control only authorizing certain activities.

Also, the customer has no existing automated/enforceable way of having different security policies for different product instances, based on their usage. For instance, certain products may be serviced by low level security personnel, while other products require agreement from the corporate compliance office and may only be serviced by high level security personnel.

Still further, with existing approaches, the company has no way of verifying that the service personnel are actually employees of the servicing company, other than via a physical badge or the like, which may be easily forged or may be retained after termination of employment.

Illustrative embodiments overcome the above and other drawbacks associated with existing authentication/authorization approaches. More particularly, illustrative embodiments provide systems and methods for decentralized identity management for cross-enterprise authentication and/or authorization. Advantageously, as will be further explained herein, illustrative embodiments utilize decentralized identity techniques with cryptographically signed tokens to control authentication and/or authorization across a class of systems or situations, i.e., in a cross-enterprise environment.

As used illustratively herein, the term "authentication" refers to a process of validating that an individual or entity is who the individual or entity purports to be. The term "authorization," as illustratively used herein, refers to a process of giving a person access to certain protected items, locations, and the like. However, it is to be appreciated that terms such as authenticate, authorize, validate, and the like, may be used interchangeably without limiting the scope of the embodiments.

Figure 1:
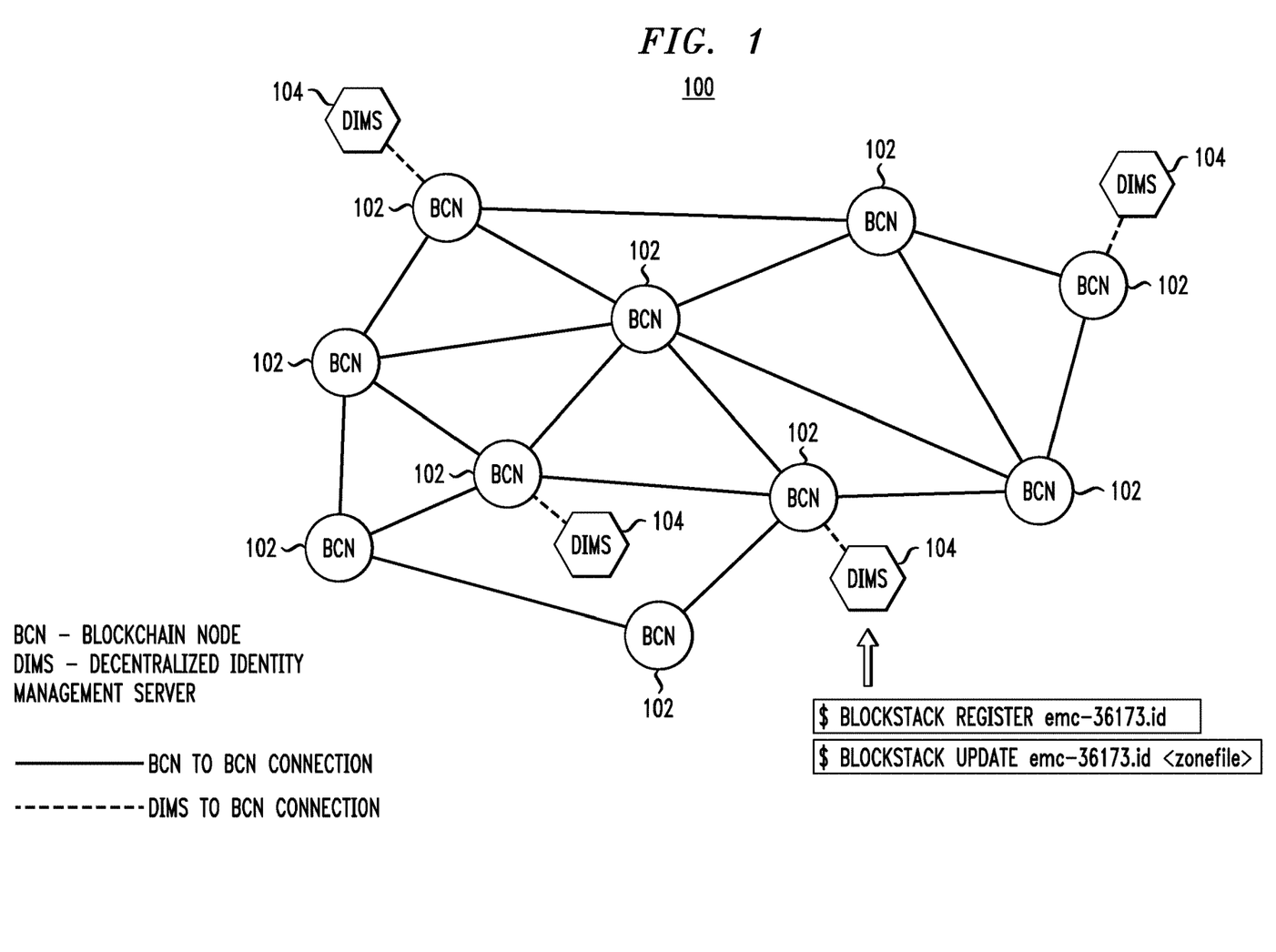
FIG. 1 illustrates a decentralized identity management system within which one or more embodiments for cross-enterprise authentication and/or authorization are implemented.

FIG. 1 illustrates a decentralized identity management system 100 within which one or more embodiments for cross-enterprise authentication and/or authorization are implemented. As shown, system 100 comprises a first set of compute nodes referred to as blockchain nodes (BCN) 102. Each BCN 102 is operatively coupled to one or more other BCN nodes 102 via a communication connection (as part of a communications network). The system 100 also comprises a second set of compute nodes referred to as decentralized identity management servers (DIMS) 104. In one embodiment, the DIMS are Blockstack nodes. Each DIMS 104 is operatively coupled to at least one BCN 102 via a communication connection (as part of a communications network). Each DIMS may also be connected to one or more other DIMSs. The BCN nodes 102 form a blockchain ledger while the DIMSs 104 form the naming system in conjunction with the underlying blockchain distributed ledger. In a Blockstack implementation, the DIMSs 104 form what is referred to as the virtualchain layer which logically resides on top of a bitcoin network formed by BCN nodes 102. The routing layer and data storage layer can be part of the DIMSs 104, or they can be implemented on different nodes.

Given the configuration of system 100, assume that a first enterprise (e.g., a vendor company or simply vendor) providing a service/product or needing access to resources of a second enterprise (e.g., a customer company or simply customer) creates an identity for one of its employees (e.g., committed via the above-mentioned preorder/register phases as "emc-36173.id"), and stores this employee identity in the decentralized identity management system 100. In accordance with an illustrative embodiment, assume the identity emc-36173.id has associated therewith one or more attributes that confirm that the employee's name is "John Smith" and that the employee identity has an expiration time with a real-time revocation check. The identity and the one or more attributes are defined in a profile record (e.g., a token file or token) cryptographically signed by the first enterprise. In the context of a Blockstack adaptation, a reference pointer to a zone file is stored in the blockchain, and then the zone file contains a reference pointer to the cryptographically signed token file. Thus, advantageously, the blockchain distributed ledger (e.g., at the blockchain layer) references the cryptographically signed token file (e.g., stored at the data storage layer). The referencing, in this illustrative embodiment, is provided by pointers that provide the connection from the blockchain layer, through the virtualchain layer and the routing layer, to the data storage layer.

Figure 2:
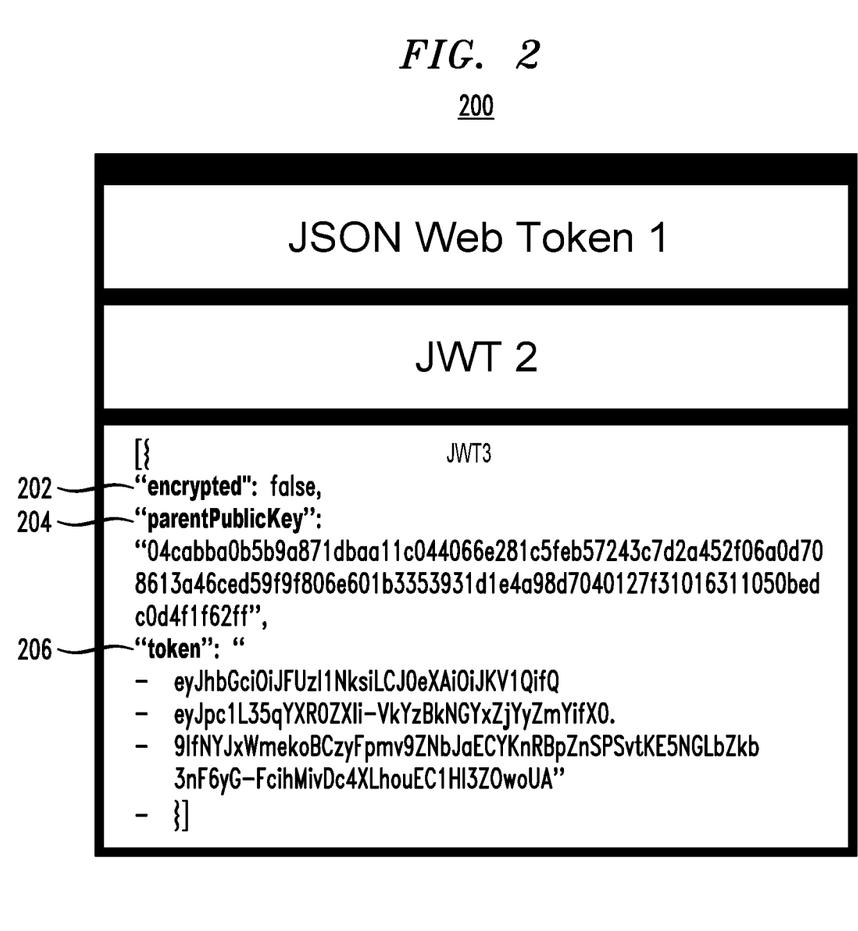
FIG. 2 illustrates a token file for use in a decentralized identity management system for cross-enterprise authentication and/or authorization, according to an illustrative embodiment.

FIG. 2 illustrates an illustrative embodiment of such a token file. More particularly, token file 200 is used in a decentralized identity management system for cross-enterprise authentication and/or authorization, e.g., system 100. Token file 200 contains records that attest to the identity of the employee that represent emc-36173.id. In this non-limiting example, token file 200 comprises information sections that define information such as the identity and the one or more attributes associated with the identity. Information section 202 indicates whether or not the token file itself or any part of the token file is encrypted by a cryptographic key. Information section 204 indicates one or more of the public keys used either to decrypt the information in the token file or to validate the signatures. In general, information is encrypted with a private key (either all the information or just a signature) and decryption via the public key then shows that only the holder of the private key could have generated the information. Information section 206 specifies the identity and the set of attributes associated with the identity. In one illustrative embodiment, the tokens may be stored as JavaScript Object Notation (JSON) Web Tokens (JWTs). The enterprise that created the token file (e.g., vendor company) maintains the token file in a decentralized fashion in system 100 via its possession of the private key. A methodology for creating and using such a token file will now be described in the context of FIG. 3.

Figure 3:
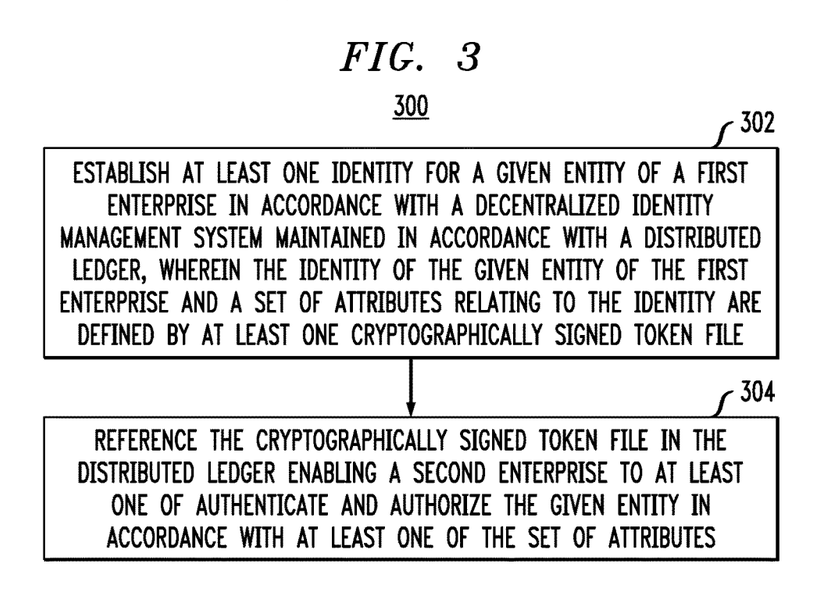
FIG. 3 illustrates a methodology for utilizing decentralized identity management for cross-enterprise authentication and/or authorization, according to an illustrative embodiment.

FIG. 3 illustrates a methodology 300 for utilizing decentralized identity management for cross-enterprise authentication and/or authorization, according to an illustrative embodiment. In step 302, at least one identity for a given entity of a first enterprise is established in accordance with a decentralized identity management system maintained in accordance with a distributed ledger, e.g., system 100. The identity of the given entity of the first enterprise (e.g., vendor) and a set of attributes relating to the identity are defined by at least one cryptographically signed token file, e.g., token file 200. In step 304, the cryptographically signed token file is referenced in the distributed ledger enabling a second enterprise (e.g., customer) to authenticate and/or authorize the given entity in accordance with at least one of the set of attributes.

Given the above-described methodology 300, several illustrative use cases will now be described. It is to be appreciated that while the illustrative use cases described below are for vendor-customer scenarios, decentralized identity management for cross-enterprise authentication and/or authorization is applicable to scenarios involving other enterprises and entities (e.g., other than vendor-customer scenarios) according to alternative embodiments.

Figure 4A:
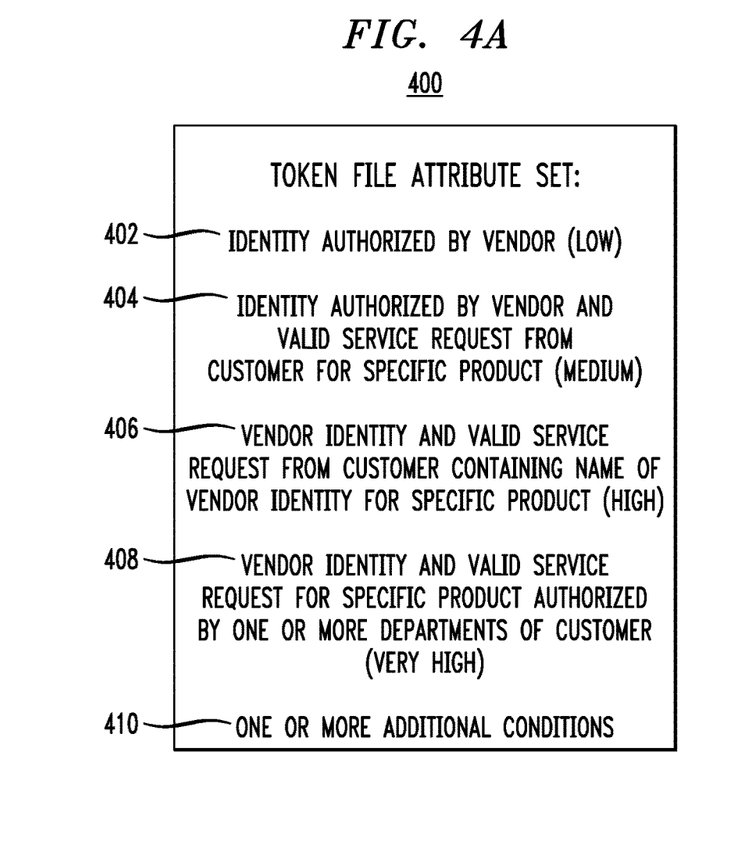
FIGS. 4A through 4E illustrate use cases of a decentralized identity management system for cross-enterprise authentication and/or authorization, according one or more illustrative embodiments.

In a first illustrative use case, assume a company needs a service action for a system purchased from a vendor company (e.g., purchased system or product). In accordance with an illustrative embodiment of decentralized identity management for cross-enterprise authentication and/or authorization, the company purchasing products and receiving service (e.g., customer) can configure their purchased system to grant a certain level of access based on a set of trusted and immutable attributes defined by one or more token files (e.g., file 200). For example, as depicted in FIG. 4A, a set of attributes 400 in a given token file (e.g., defined in information section 206 of token file 200) may include rules that serve to: (i) grant low level access for any identity authorized by the vendor (attribute 402); (ii) grant medium level access for any identity authorized by the vendor and for which there is a valid service request authorized by the customer for this particular purchased system (attribute 404); (iii) grant high level access for a vendor identity if there is a valid service request from the customer which contains the name of that vendor identity and is for this particular purchased system (attribute 406); (iv) for a very high security system, grant access only if there is a service request authorized by the customer in accordance with one or more entities (e.g., departments) of the customer and their internal procedures, in addition to the above attributes (attribute 408); and (v) set other appropriate authentication and/or authorization conditions (attribute 410).

Further regarding attribute 408, as mentioned, the request may be authorized by one or more departments of the customer according to their internal procedures. For example, this may involve cases where servicing a financial system may need authorization from both the IT department and the finance department, while servicing a finance system in the middle of an audit or lawsuit may require a service request signed by the IT department, the finance department, the legal department, and the compliance department, etc.

In a second illustrative use case, assume that a company needs security on a phone call or a physical site. In accordance with an illustrative embodiment of decentralized identity management for cross-enterprise authentication and/or authorization, the customer may configure their own systems to only authorize: (i) specific vendor employees for high security situations; (ii) vendor employees marked as being on the account team for the customer; and (iii) vendor employees who have a signed security clearance from a governmental organization. These access rules may also be made part of the token file attributes.

Figure 4B:
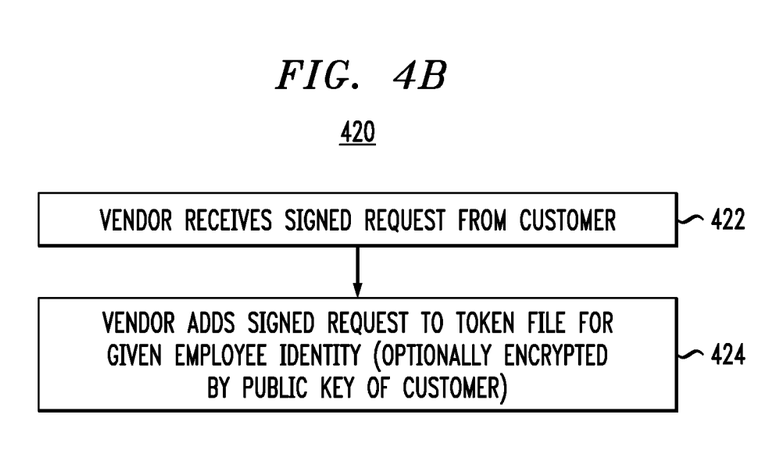

In a third illustrative use case, when a service request is raised by the customer, it may be handled in one of several ways, depending on the severity and the specifics of the situation:

(i) For a medium level service request, as depicted in process 420 in FIG. 4B, the vendor receives the signed request from the customer (step 422) and the vendor then adds this signed request to the corresponding token file (e.g., to information section 206 of token file 200) for identity emc-36173.id (step 424). For additional security, the signed request may be encrypted by the public key of the customer before being stored with the token file.

Figure 4C:
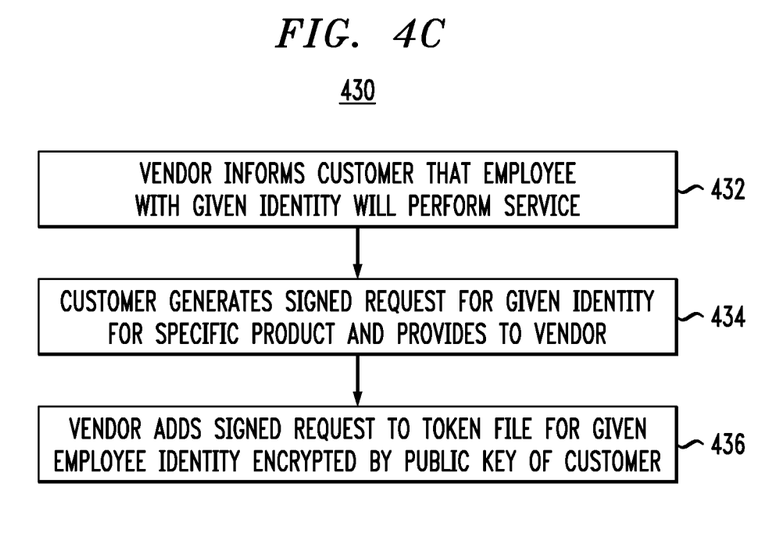

(ii) For a high level service request, as depicted in process 430 in FIG. 4C, the vendor informs the customer that emc-36173.id will be performing the service (step 432). The customer then generates a signed request for emc-36173.id to service the purchased system X and passes this to the vendor (step 434). The vendor then enters this request in the token file of emc-36173.id encrypted by the public key of the customer (step 436).

Figure 4D:
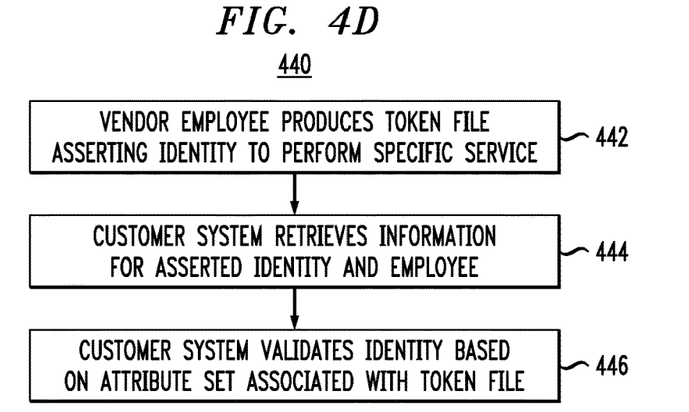

When the service engineer arrives and attempts to authenticate, the following occurs as depicted in process 440 in FIG. 4D:

(i) The engineer produces a token asserting that they are "John Smith," the vendor employee emc-36173.id, and would like to perform service on the purchased system X (step 442).

(ii) The system retrieves the profiles (token file(s)) for "John Smith" and the vendor employee emc-36173.id (step 444). Note that these could be retrieved from the public identity network (part of system 100), or these could be retrieved from a cache of select public identities maintained locally by the customer which would be especially useful for a dark site or other such sites not connected to a public network.

(iii) The system validates that the token file asserting that the person purports to be emc-36173.id is correctly signed (part of step 446).

(iv) The system validates that emc-36173.id is properly signed and that it has an attribute asserting that this vendor id is associated with "John Smith" (part of step 446).

(v) If necessary, the system validates that the token file for emc-36173.id has a properly signed attribute for a service operation on purchased system X, presumably by emc-36173.id (part of step 446). This operation must be signed by the customer, presumably by the compliance department or other authorizing entity of the customer, depending on the particulars of the purchased system and of the service. In the case of a low level service operation, merely validating that the employee is an authorized vendor employee may be sufficient.

(vi) Assuming all checks pass, the service is authorized and may proceed.

Figure 4E:
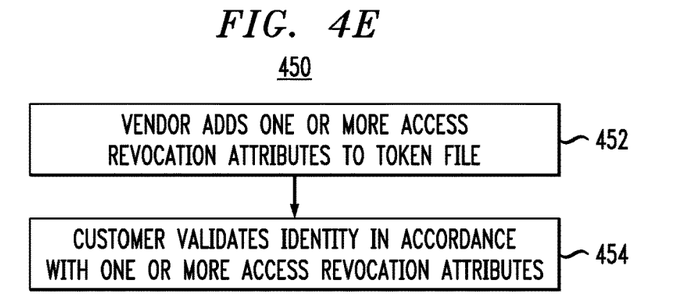

Various illustrative use cases to revoke access may be implemented in accordance with an illustrative embodiment of decentralized identity management for cross-enterprise authentication and/or authorization. As depicted in process 450 in FIG. 4E, the vendor adds one or more access revocation attributes to the token file (e.g., to information section 206 of token file 200) in step 452, and the customer validates the identity in accordance with these attributes in step 454.

By way of example only, assume that the token file for emc-36173.id, which asserts that "John Smith" is associated with emc-36173.id, has an attribute stating that if looking up a specific uniform resource locator (URL) returns a certain value, then the assertion that "John Smith" is associated with emc-36173.id has been revoked. An expiration time on the original assertion may also be used, but this lacks a way to immediately revoke the assertion. If the lookup of the URL is not possible, it is dependent on the customer to decide to accept or reject the assertion, likely based on the specific security situation. Another example of a revocation method is to remove the signed request from the token file.

For a phone call or site access use case, the process could be similar. For example, before granting access to the phone call or site, the vendor employee would need to produce a token file asserting that he/she is "John Smith." The token file would be validated as properly signed and indicate that he/she is emc-36173.id, that the profile for emc-36173.id confirms that his/her name is "John Smith," that the token file has a token from the customer granting access to emc-36173.id for this phone call or meeting room, etc. Assuming all such checks pass, then access is granted.

As mentioned above, if desired, the access to a phone call or meeting may be encrypted by the public key of the customer before associating that information with the profile (token file) of emc-36173.id, thus preserving privacy for the customer.

Advantageously, in accordance with illustrative embodiments, the use of a decentralized identity means that no trust need exist between the vendor internal network and the internal network of customer. Further, the various systems in place at the customer facilities do not have any single set of credentials which a service engineer may use to gain inappropriate access. The customer can eliminate any access from vendor personnel to the systems without gaining unauthorized access. The customer could simply configure all their systems as needing a service request specifically for a given product and then never issue such a request. Vendor personnel are then denied access but without the issues of the customer changing the service passwords and therefore inappropriately gaining access. Still further, each vendor employee has his/her unique identity which is ultimately authorized. This is more secure than providing a physical identification to that employee, which could be used by a different employee.

The same general authentication/authorization methodologies according to illustrative embodiments can be used for sites which may be permanently or intermittently disconnected from the public Internet.

In the extreme case, the service engineer may bring a small USB (universal serial bus) stick or some sort of fob (or other portable device) which has the appropriate profile (e.g., token file) for "John Smith" and emc-36173.id, including the appropriate attributes (e.g., rules) for the service requests, allowing for a completely local authentication/authorization according to the above algorithm.

Such a completely local authentication may have a problem with a service engineer reusing a stale profile for emc-36173.id and/or for the service request. These problems may be mitigated by the use of expiration times on the token file(s), e.g., the service request for purchased system X for employee id emc-36173.id is valid for only one day. This severely limits the window for using stale credentials. The problems may further be mitigated by processes at the customer site, e.g., by publicly validating the token file(s) for "John Smith" and emc-36173.id on a system with public Internet access before allowing the service engineer access to a system with no Internet access.

When an employee is terminated by the vendor, there is no need for manual coordination with the customer to revoke access. The vendor can update the token file for emc-36173.id to remove the association with "John Smith" and/or may use the revocation clause in the emc-36173.id token file, either of which are sufficient to deny access to "John Smith" at the customer facilities, systems, etc. Advantageously, a given token file can be retrieved from and is validated by its existence in the decentralized identity system 100.

At least portions of the system for decentralized identity management for cross-enterprise authentication and/or authorization shown in FIGS. 1-4E may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 5.

As is apparent from the above, one or more of the processing modules or other components of the system for decentralized identity management for cross-enterprise authentication and/or authorization shown in FIGS. 1-4E may each run on a computer, server, storage device or other processing platform element. A given such element may be viewed as an example of what is more generally referred to herein as a "processing device." An example of such a processing platform is processing platform 500 shown in FIG. 5.

Figure 5:
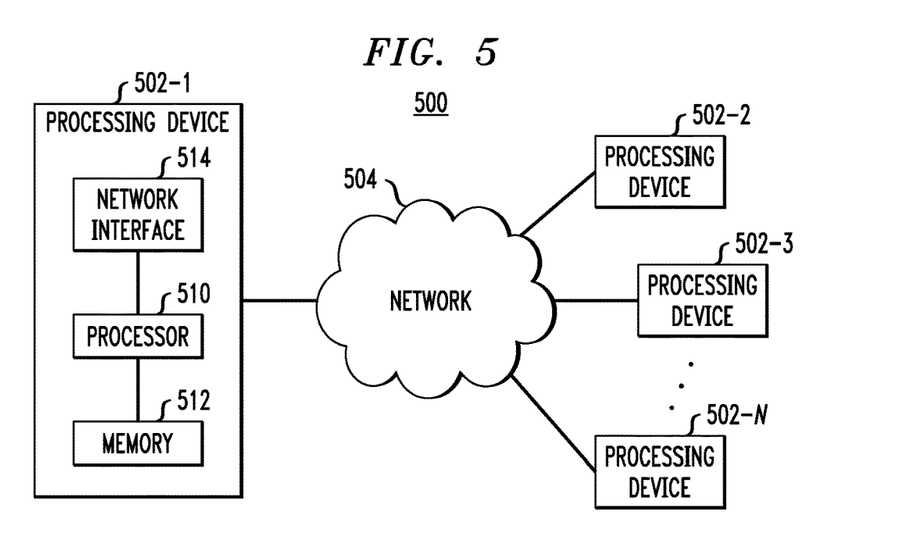
FIG. 5 illustrates a processing platform used to implement a decentralized identity management system for cross-enterprise authentication and/or authorization, according to an illustrative embodiment.

The processing platform 500 in this embodiment comprises a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 of the example embodiment of FIG. 5 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for decentralized identity management for cross-enterprise authentication and/or authorization, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for decentralized identity management for cross-enterprise authentication and/or authorization. Such components can communicate with other elements of the system over any type of network or other communication media.

As indicated previously, in some embodiments, components of the system for decentralized identity management for cross-enterprise authentication and/or authorization as disclosed herein can be implemented at least in part in the form of one or more software programs stored in memory and executed by a processor of a processing device. For example, at least portions of the execution environment or other logging system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for decentralized identity management for cross-enterprise authentication and/or authorization. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
    establishing at least one identity for a given entity of a first enterprise in accordance with a decentralized identity management system maintained in accordance with a distributed ledger, wherein the identity of the given entity of the first enterprise and a set of attributes relating to the identity are defined by at least one cryptographically signed token file;
    referencing the cryptographically signed token file in the distributed ledger enabling a second enterprise to at least one of authenticate and authorize the given entity in accordance with at least one of the set of attributes; and
    utilizing the cryptographically signed token file to make an automated decision whether or not to grant the given entity of the first enterprise access to an environment controlled by the second enterprise;
    wherein a given level of access to the environment of the second enterprise is granted to the given entity of the first enterprise when the identity is authorized by the first enterprise;
    wherein the method is implemented via one or more processing devices each comprising a processor coupled to a memory.

2. The method of claim 1, wherein a given level of access to the environment of the second enterprise is granted to the given entity of the first enterprise when the identity is authorized by the first enterprise and the set of attributes of the cryptographically signed token file comprises a request from the second enterprise.

3. The method of claim 1, wherein a given level of access to the environment of the second enterprise is granted to the given entity of the first enterprise when the identity is authorized by the first enterprise and the set of attributes of the cryptographically signed token file comprises a request from the second enterprise containing a name associated with the given identity and a specific environment to which the given entity is to be given access.

4. The method of claim 1, wherein a given level of access to the environment of the second enterprise is granted to the given entity of the first enterprise when the identity is authorized by the first enterprise and the set of attributes of the cryptographically signed token file comprises a request from one or more authorizing entities of the second enterprise containing a name associated with the given identity and a specific environment to which the given entity is to be given access.

5. The method of claim 1, wherein the automated decision whether or not to grant the given entity of the first enterprise access to the environment controlled by the second enterprise is based on at least one revocation attribute contained in the set of attributes of the cryptographically signed token file.

6. The method of claim 5, wherein the revocation attribute is an expiration time associated with the identity of the given entity of the first enterprise.

7. The method of claim 5, wherein the revocation attribute is a check that automatically determines if the identity of the given entity of the first enterprise has been revoked.

8. The method of claim 1, wherein the set of attributes of the cryptographically signed token file comprises a revocable request from the second enterprise, and wherein the request itself is cryptographically signed by the second enterprise.

9. The method of claim 1, wherein the first enterprise is a vendor and the second enterprise is a customer of the vendor, and wherein the given entity is an individual associated with the vendor tasked with performing a service that necessitates access by the individual to the environment controlled by the customer.

10. The method of claim 9, wherein the environment controlled by the customer comprises at least one of a customer facility and a customer communication system.

11. The method of claim 10, wherein the individual associated with the vendor is tasked with performing a service on a product provided by the vendor to the customer, and wherein the product is located within the customer facility.

12. The method of claim 1, further comprising:
    storing the cryptographically signed token file on a portable device;
    the given entity of the first enterprise presenting the portable device with the cryptographically signed token file to the second enterprise; and
    the second enterprise utilizing the cryptographically signed token file to make an automated decision whether or not to grant the given entity of the first enterprise access to an environment controlled by the second enterprise.

13. The method of claim 1, wherein the decentralized identity and the set of attributes contained in the cryptographically signed token file for the given entity enables the second enterprise to not have to maintain a dedicated set of access credentials for giving access to the given entity.

14. The method of claim 1, wherein the token file is cryptographically signed using a private key assigned to the first enterprise such that the token file can be verified using a public key corresponding to the private key.

15. The method of claim 1, wherein the decentralized identity management system is adapted from a blockstack-based system.

16. The method of claim 1, wherein the distributed ledger is a blockchain distributed ledger.

17. A system comprising:
    at least one processor, coupled to a memory, and configured to:
    establish at least one identity for a given entity of a first enterprise in accordance with a decentralized identity management system maintained in accordance with a distributed ledger, wherein the identity of the given entity of the first enterprise and a set of attributes relating to the identity are defined by at least one cryptographically signed token file;
    reference the cryptographically signed token file in the distributed ledger enabling a second enterprise to at least one of authenticate and authorize the given entity in accordance with at least one of the set of attributes; and
    utilize the cryptographically signed token file to make an automated decision whether or not to grant the given entity of the first enterprise access to an environment controlled by the second enterprise;
    wherein a given level of access to the environment of the second enterprise is granted to the given entity of the first enterprise when the identity is authorized by the first enterprise.

18. A computer program product comprising a non-transitory processor-readable storage medium having stored therein program code of one or more software programs, wherein the program code when executed by at least one processing device causes said at least one processing device to:
  establish at least one identity for a given entity of a first enterprise in accordance with a decentralized identity management system maintained in accordance with a distributed ledger, wherein the identity of the given entity of the first enterprise and a set of attributes relating to the identity are defined by at least one cryptographically signed token file; and
  reference the cryptographically signed token file in the distributed ledger enabling a second enterprise to at least one of authenticate and authorize the given entity in accordance with at least one of the set of attributes; and
  utilize the cryptographically signed token file to make an automated decision whether or not to grant the given entity of the first enterprise access to an environment controlled by the second enterprise;
  wherein a given level of access to the environment of the second enterprise is granted to the given entity of the first enterprise when the identity is authorized by the first enterprise.

19. The system of claim 17, wherein the decentralized identity and the set of attributes contained in the cryptographically signed token file for the given entity enables the second enterprise to not have to maintain a dedicated set of access credentials for giving access to the given entity.

20. The computer program product of claim 18, wherein the decentralized identity and the set of attributes contained in the cryptographically signed token file for the given entity enables the second enterprise to not have to maintain a dedicated set of access credentials for giving access to the given entity.

* * * * *